United States Patent [19]
Friend et al.

[11] Patent Number: 6,052,279
[45] Date of Patent: Apr. 18, 2000

[54] CUSTOMIZABLE HAND-HELD COMPUTER

[75] Inventors: Steven Darren Friend, Felton; Dennis Silva, San Jose; Kurt A. Kordes, Pleasanton, all of Calif.

[73] Assignee: Intermec IP Corp., Woodland Hills, Calif.

[21] Appl. No.: 08/984,323

[22] Filed: Dec. 3, 1997

Related U.S. Application Data

[60] Provisional application No. 60/031,853, Dec. 5, 1996.

[51] Int. Cl.[7] .................................. H05K 5/00; H05K 7/16
[52] U.S. Cl. .......................... 361/686; 361/680; 361/681; 361/731; 361/725
[58] Field of Search ............................ 345/156; 361/679, 361/680, 681, 686, 725, 730, 731; 364/708.1

[56] References Cited

U.S. PATENT DOCUMENTS 5,617,343  4/1997  Danielson et al. ...................... 364/707
5,801,918  9/1998  Ahearn et al. .......................... 361/683

*Primary Examiner*—Richard A. Hjerpe
*Assistant Examiner*—Benjamin D. Bowers
*Attorney, Agent, or Firm*—Suiter & Associates

[57] ABSTRACT

A customizable hand-held data terminal system employs multiple housing bases able to accommodate different components allow the manufacture of hand-held data terminals with a variety of features based on a single design. Because the system according to the present invention does not require the external mounting of components, the ergonomics and basic footprint of the unit remains unaltered. The present system also alleviates problems with moisture resistance, shielding, and survivability under harsh treatment associated with terminals employing externally mounted end cap modules or pod. The present invention employs a plurality of different sized base units which can accommodate a variety of different components and configurations, and wherein the different base units are interchangeable with a single upper surface and user interface comprising a display screen and keypad.

9 Claims, 3 Drawing Sheets

CUSTOMIZABLE HAND-HELD COMPUTER

RELATED APPLICATION

This application claims priority under 35 U.S.C. § 119(e) based on U.S. provisional application Ser. No. 60/031,853 (Attorney Docket No. 38297P1), filed Dec. 5,1996.

TECHNICAL FIELD

This invention pertains to a system and method for the manufacture or configuration of customizable hand-held computers, and more particularly, to a system and method for the manufacture or configuration of hand-held computers whereby a variety of interchangeable parts are employed to produce a variety of custom configurations.

BACKGROUND OF THE INVENTION

Portable computers, such as hand-held data entry terminals, personal digital assistants, and the like are commonly used in a variety of applications. For example, such computers are commonly used by individuals for personal computing purposes, by sales persons, distributors, delivery persons, auditors, and the like, where it is advantageous to employ a portable computer terminal in a route or otherwise mobile setting. Such applications include sales, distribution, control and inventory of products delivered, and delivery or tracking of products, packages, etc. Portable or hand-held data terminals have proven useful in increasing the efficiency of such applications by automating the entry and electronic storage of order, sales, delivery, receipt, pricing, inventory control, and other accounting functions.

Users of hand-held computer systems have a variety of needs and budgets, ranging from simple data collection and storage units to advanced systems for sales or distribution automation allowing real time communication with a wireless network.

To accommodate a variety of needs and budgets, it is known to provide a basic data collection and storage terminal whereby additional peripheral devices can be added, depending on a user's needs. Examples of such peripheral devices include bar code scanners or other optical scanning devices, additional RAM, hard drives or other mass storage device such as devices for storage on removable magnetic media, optical media, magneto-optical media, removable hard drive media, and the like, CD ROM, recordable (read/write) CD, or DVD drives, magnetic stripe readers, wired or wireless LAN links, WAN links, CDPD links, microlink, optical links, ultrasound links, extra battery packs, etc.

A data terminal may be designed with basic data collection and storage features and a means for attaching additional units as desired. Such additional units can be attached to the end of the data terminal, for example. While such a system provides expandability, there are disadvantages. For example, computers designed for mobile use are often ruggedly constructed to meet certain criteria, e.g., repeated drops or a minimum number of drops from a given height on concrete, etc. However, the same terminal designed with a certain degree of ruggedness may lose its survivability with a module such as a scanner or an RF transceiver, etc., attached as an end unit. Alternatively, the attached module may not possess the same survival characteristics as the terminal to which it is attached.

Another disadvantage of employing end unit modules is that the mass distribution and balance are altered and the same unit with an end cap module may not be as ergonomically favorable to use.

Yet another disadvantage of end cap module systems is moisture problems. Hand-held units which can withstand use in inclement weather may lose this ability when an end cap module with an inferior seal is employed.

Finally, when a peripheral device is connected externally, it may be difficult to provide adequate shielding, causing problems with electromagnetic interference, problems with dissipation of a discharge of accumulated static electricity by a user, etc.

Some of the aforementioned problems, such as balance, shielding, weather resistance may be alleviated in systems which employ expandable modules or pods, e.g., scanners, RF transceivers, memory, modems, etc., which are designed to fit on a surface such as the undersurface of a hand-held terminal which contains a removable plate, rather than the end of the data terminal. The housing of such pods can sealingly engage with the housing of the data terminal, and the housing can contoured for a user's hand.

Thus, it is desirable to provide a data terminal system of components and method of manufacture that provides a range of configurations from simple data collection capabilities for later batch transfer of data to the most advanced and demanding applications, and that can be manufactured and upgraded employing interchangeable and exchangeable components without relying on custom designed upgrade modules. In addition to the problems with ruggedness, ergonomics, moisture, and shielding, a problem with data terminal design based on the use of attachable expansion modules is design costs required to meet a variety of needs since each terminal type often requires a specially designed upgrade component. For example, the peripheral end cap units or pods are often designed for use with a particular unit or several related units since such an externally mounted unit is dependent on the shape and configuration of the hand-held terminal it is designed for. Also, typically, only one end cap module could be used at a time, thus limiting expandability. Thus, as an example, whether a user with a basic data collection terminal which employs an end cap or pod module upgrades can upgrade to both scanning capability and wireless RF link simultaneously depends on whether an integrated scanner/radio module exists for the particular terminal. As a result, multiple and often incompatible designs providing different levels of mobile computing features have proliferated, and a user desiring to upgrade a mobile computing system's capabilities may be required to choose between losing its initial investment in terminals, terminal docks, peripherals, custom software, etc., by switching to a more advanced system or doing without additional features.

SUMMARY OF THE INVENTION

It is, therefore, and object of the present invention to provide a hand-held data terminal system which can easily be configured to a wide variety of capabilities, both during the manufacturing or configuring process and as a later upgrade, and which employs standardized and interchangeable parts, thus resulting in deceased design parts.

This and other objects of the present invention are provided by the data terminal system, and process for the manufacture thereof, having a housing which comprises an upper shell and a base shell, and wherein standardized and/or interchangeable hardware components are employed and wherein any number or combination of additional or peripheral components may be added by employing a base shell of the appropriate size and mounting configuration (or, in the case of upgrades, replacing the existing base shell with one designed to accommodate the additional components).

Examples of components include, for example, spare battery modules, scan engines, CD ROM, recordable (read/write) CD, or DVD drives, hard drives, coprocessors, magnetic stripe readers, wired or wireless LAN, WAN, CDPD, Microlink, floppy drives, removable media mass storage devices such as optical, magneto optical, floptical, removable magnetic media drives, modems, fax modems, PC cards, wireless links such as IR, ultrasound, optical including fiber optic links, etc.

The system and method according to the present invention has the advantage of providing great flexibility and upgradability in the number of configurations and features while minimizing design and upgrade costs in that standard components may be employed, with only the inexpensive housing shell requiring design and, in the case of upgrades, replacement.

Because the peripheral components are not provided on specially designed modules mounted outside the computer housing, but rather incorporated into a single housing, problems with moisture or weather resistance can be eliminated inasmuch as the same seal will be employed, regardless of the base shell employed. Also, the ergonomics of the unit are not disrupted by placement of a large mass at the end of the terminal. The adaptable base shell can also have the same ruggedness for all configurations, supplied, for example, by coverings of rubber, plastic, or other resilient or shock absorbing material, etc. Also, the shielding problems associated with external modules such as electromagnetic interference, or harming of sensitive components by an electrostatic discharge can be alleviated because all components can be housed within a single shielded housing.

The present invention also relates to a method of manufacturing or configuring a data collection terminal to any one of a wide variety of configurations comprising the steps of ascertaining the desired components to be included in the data terminal, selecting the appropriate base unit according to the present invention to accommodate the desired components, and assembling the data terminal. By "desired components," it is meant any components requested by a user, components particularly advantageous configuration for marketing purposes, or components a user or future purchaser will likely desire to upgrade to, etc.

BRIEF DESCRIPTION OF THE DRAWINGS

The detailed description of the invention may be best understood when read in reference to the accompanying drawings wherein.

DETAILED DESCRIPTION OF THE INVENTION

Figure 1:
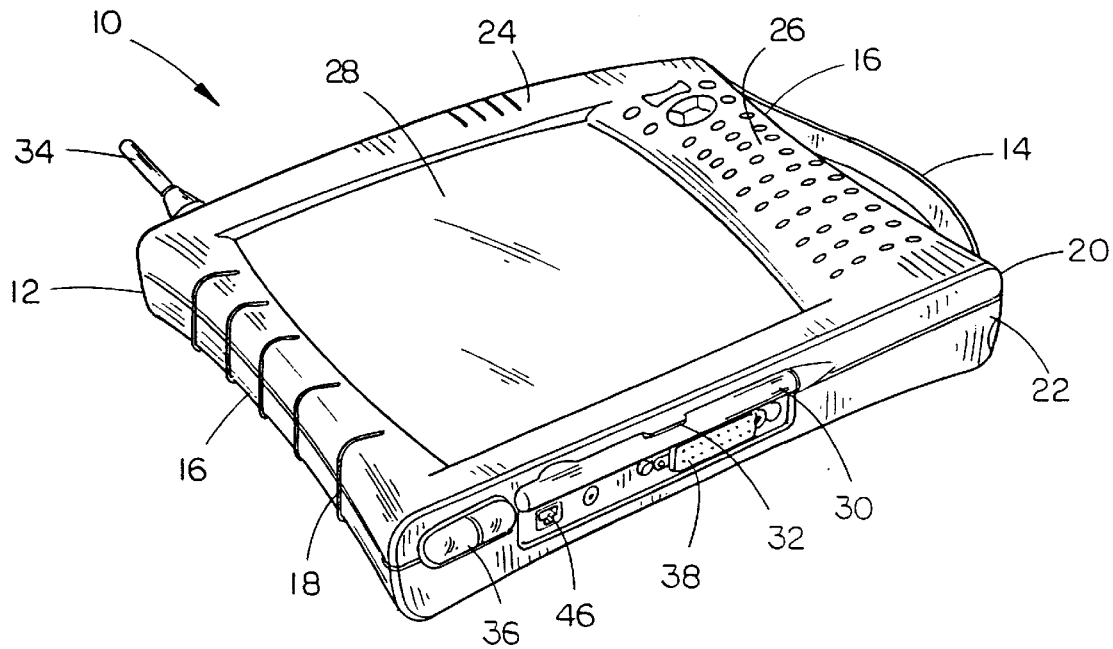
FIG. 1 is a top perspective view of a customizable computer according to the present invention.
Figure 2:
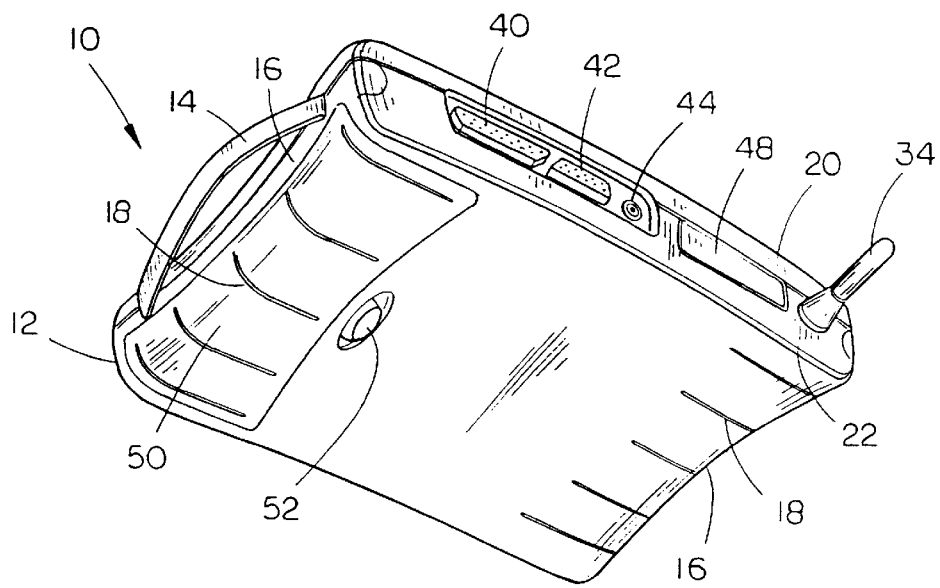
FIG. 2 is a bottom perspective view of the embodiment depicted in FIG. 1.
Figure 3:
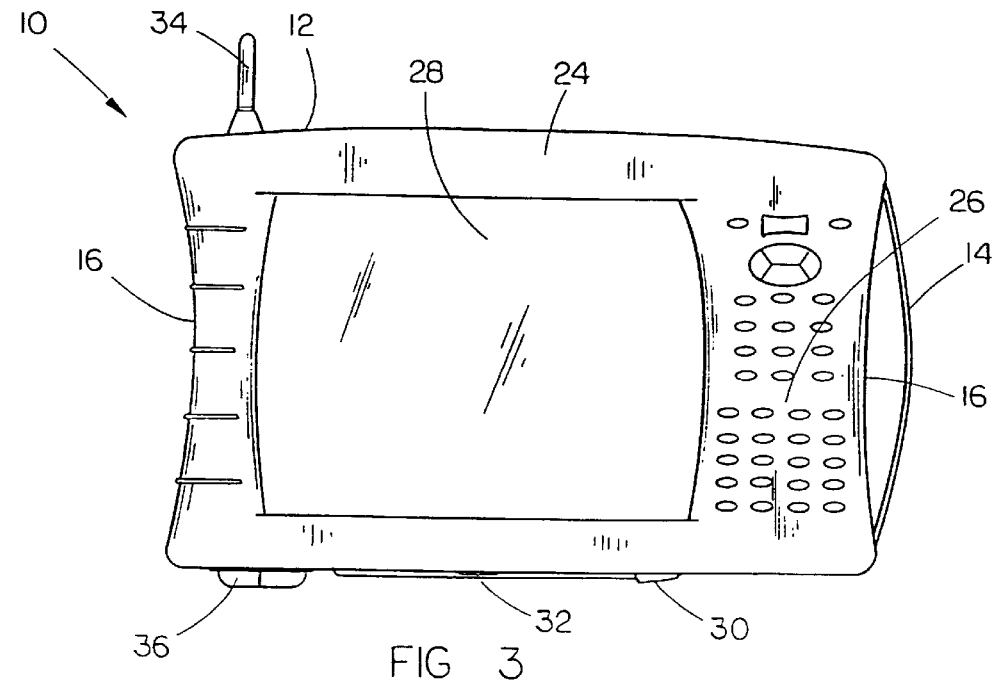
FIG. 3 is a top view of a customizable computer according to the present invention.

Referring now to the accompanying drawings, FIGS. 1–3 show a portable hand-held data terminal 10 in accordance with the present invention. FIG. 1 shows an top elevational view of data terminal 10 and FIG. 2 shows a bottom elevational view of data terminal 10. FIG. 3 is a top view of the embodiment shown in FIGS. 1 and 2. The data terminal 10, as described herein, has a generally rectangular housing 12 encasing the data terminal.

As depicted herein in a preferred embodiment, housing 12 may have a hand strap 14 attached thereto and, in an especially preferred embodiment, housing 12 comprises curved or otherwise shaped areas 16 for accommodating a user's hand between hand strap 14 and housing 12. Hand strap 14 is advantageously adjustable, e.g., looped through a ring (not shown) wherein it may be fastened to itself via hoop and loop fasteners. As shown herein, housing 12 has curved areas 16 on each side and hand strap 14 may be attached to either side. Advantageously, housing 12 also has molded ridges 18 on the gripping regions 16, which serve to enhance the roughness of the housing 12, thus providing a better grip adhesion and decreasing the risk that data terminal 10 will slip from the hands of an operator. Alternatively, ridges 18 could be molded grooves.

Housing 12 preferably comprises a high impact strength material. Various types of moldable high impact strength plastic materials are known and are generally available. Portions of housing 12 may comprise moldings of rubber, thermoplastic rubber material, or other resilient, impact resistant, shock absorbing material (not shown) bonded to the surface of housing 12, e.g., via a co-molding process. Housing 12 comprises an upper shell 20 and lower shell 22 which sealingly engage. Upper surface 24 has a keypad 26 and display screen 28 thereon. Keypad 26 may range from a few input keys to a full alphanumeric keypad. Although keypad 26 and display screen 28 are depicted in a side-by-side arrangement, any other arrangement may be employed, such as where the keypad 26 is located beneath the display 28, etc. Display 28 may be, for example, an LCD screen, and may optionally comprise a back light (not shown). Because of power consumption considerations, and especially since LCD screens typically provide satisfactory viewing contrast under most direct lighting conditions, where a back light is employed, it is preferable to include a selective back light disablement feature which may be manual, controlled by user operated software, or automatically disabled and enabled depending on available light, e.g., detected by a photosensor (not shown) located on the surface of housing 12. Backlighting may also be automatically temperature compensated to adjust for differences in luminescence over a range of temperatures. For example, the range of temperatures likely to be encountered by the data terminal 10 during operation is generally from about −4° F. to about 125° F.

As depicted in FIG. 1, the display 28 is relatively large size, occupying a substantial portion of the upper surface 24. Display 28 may be controlled to operate in, for example, a standard VGA format, and preferably comprises a full screen VGA (640 by 480 pixels). Display 28 may be monochrome, gray scale with, for example, 4, 8, 16, or 64 levels of gray, or color depth.

Data entry may be enhanced by a touch sensitive screen overlay over display 28 for tactile touch or stylus data entry. Data terminal 10 is shown here with stylus 30 attached to housing 12 via stylus attachment clip 32. Stylus 30 and clip 32 may optionally be recessed into a cavity (not shown) within outer surface of housing 12. Data input via touch screen is preferably interpreted by software. For example, a signature or other graphical information may be entered, optionally compressed, and stored, or converted to text by character recognition software for interpretation of hand written data.

Other features of the data terminal 10 include radio antenna 34 for communication via a radio transceiver (not shown), infrared (IR) port 36, and data ports 38, 40, and 42, comprising electrical connectors, a connector 44 which may be, for example, a coaxial connector, phone jack 46, and a scanning engine 48, e.g., code or optical character reader or laser scanner. Also depicted is a removable door 50, e.g., a battery compartment door, and latch 52, located on base shell 22 of housing 12. Also, electrical contacts (not shown) for battery recharge, e.g., in a docking station, may be provided.

Figure 4:
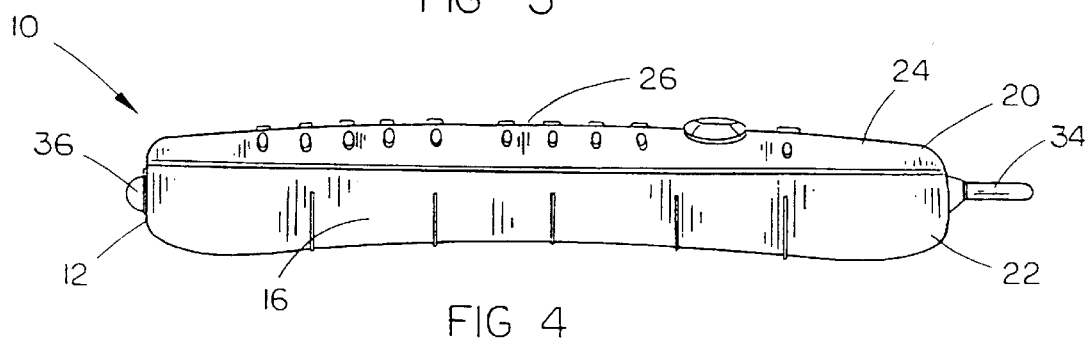
FIGS. 4 and 5 are side views of the customizable computer according to the present invention.
Figure 5:
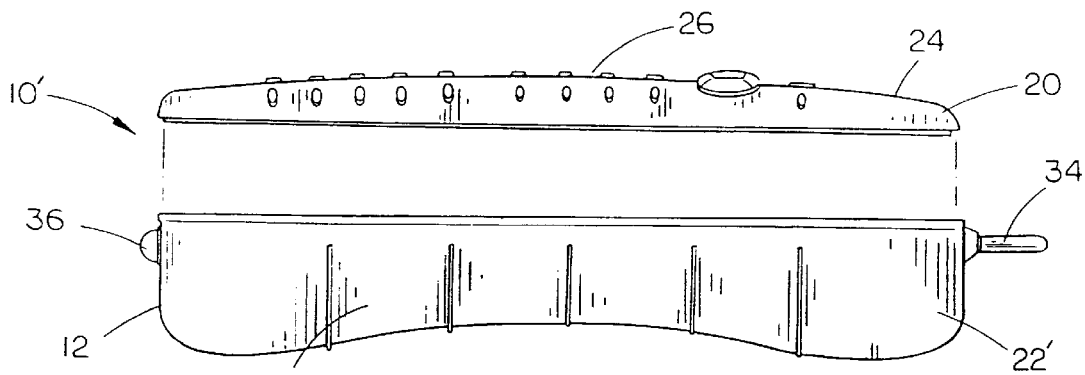

FIGS. 4 and 5 illustrate the customizable data terminal system and method of manufacture according to the present invention. FIG. 4 is a side view of an embodiment of data terminal 10 similar to that shown in FIGS. 1–3. FIG. 5 shows a data terminal 10' which differs from that shown in FIGS. 1–4 in that housing 12 comprises a larger base shell 22 ', which allows installation of additional components.

Thus, the system according to the present invention provides a simple method for providing a very wide range of data terminal capabilities in a single design and provides for ease of upgradability without the use of customized endcap modules, pods, or the like. Since all components are internally mounted, the shielding and moisture problems associated with externally mounted components can be avoided.

The system according to the present invention is described herein as a two-tiered system wherein the user interface, i.e., keypad area 26 and display screen 28 are the same, and wherein a smaller base shell 22 or larger base shell 22' is employed, depending on the needs of the ultimate user.

The simplest data terminal according to the present invention is a data terminal which collects data and stores the collected data in memory for later batchwise transfer of data to an alternate data processing unit, host computer, network or the like. Typically, data is collected by a user and then later placed in a docking station for data transfer and battery recharge, e.g., at the end of an operator's shift or periodically throughout a user's shift. Such docks may be connected to a mainframe computer, computer network, or may communicate to a host computer or network via a wireless link, e.g., an RF transceiver, optical link, IR, ultrasound, cellular link, and the like. Such docks are typically located, for example, in warehouses, delivery vehicles, etc. In addition to downloading collected data from the data terminal, the docking station may also be used for transferring data such as schedule and route information and the like to the data terminal. Since each base shell configuration will have essentially the same footprint, only a single type of docking unit is necessary.

The first embodiment employing small base shell 22 (FIGS. 1–4) is suitable for simple data collection and storage. Data communication I/O ports are provided to allow connection of the data terminal to peripheral devices such as a printer, fax, modem, optical scanner, etc.

It is also contemplated that the first embodiment employing small base shell 22 may accommodate a RF transceiver for wireless communication with a LAN or WAN, and/or an optical scanning device. Combined RF transceivers and optical scanners are known in the art and may be employed as a component of the data terminal and data terminal system according to the present invention. The first embodiment employing small base shell 22 also preferable comprises a coaxial connector and switch allowing attachment of a remote high gain RF antenna for communication with a LAN or WAN from within a vehicle such as a forklift operating in a warehouse or in delivery truck or van, etc.

The first embodiment employing small base shell 22 preferably further comprises a wireless link such as an IR port for data exchange with a host computer or network.

Finally, since portable or hand-held data terminals are generally understood in the art as being powered by a self-contained power source, the terminal 10 according to the present invention will contain at least one battery or battery pack. In one embodiment, battery compartment door 50 may be attached to or an integrally molded portion of the battery or battery pack (not shown).

The second embodiment employing large base shell 22' will preferably accommodate some or all of the devices listed above, such as a RF transceiver and/or an optical scanner, a fax or fax/modem, battery, and may further accommodate additional components including an additional hard disk drive, additional batteries, PCMCIA card slots, CD ROM, recordable (read/write) CD, or DVD drives, floppy drives, mass storage media drives such as removable high capacity magnetic disk drives, removable hard drives, optical storage drives, floptical drives, tape drives, magneto-optical drives, and the like.

Additional batteries may be necessary where the terminal will be operated under very high or low temperature conditions not suitable for long battery life, where a display with a high level of shades of gray or color, or where a delivery or distribution route or work shift is very long.

The present invention is not limited to any particular configuration of components and, for example, it is not necessary that the first embodiment employing smaller base shell 22 comprise or be able to accommodate all of the components detailed above. Similarly, it is not necessary that the embodiment of the present invention employing large base shell 22' accommodate all of the aforementioned devices simultaneously. For example, one or more of the expansion bays may be configured to accept more than one type of component.

Figure 6:
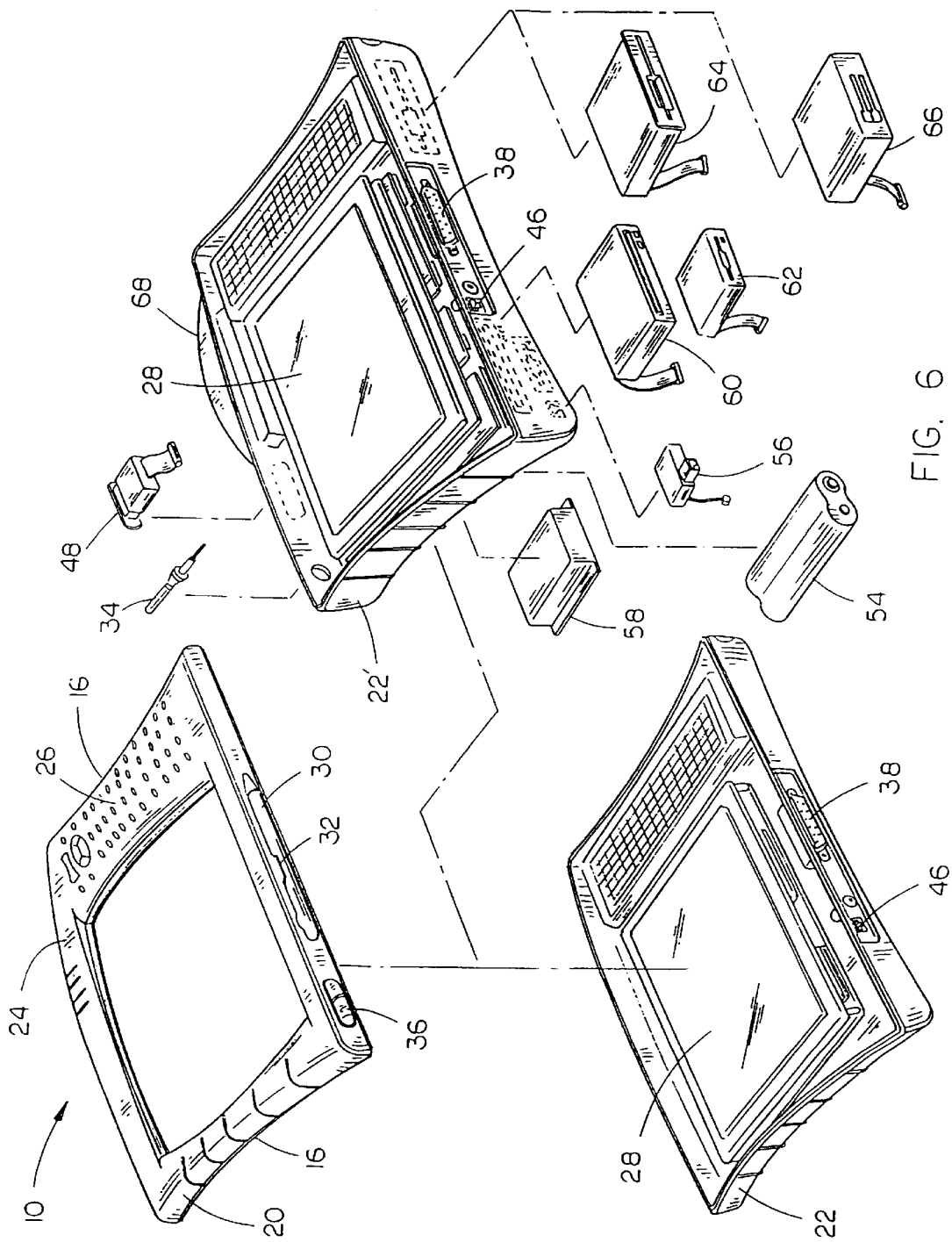
FIG. 6 is an exploded view of the customizable computer according to the present invention.

FIG. 6 depicts an exploded view of an exemplary embodiment and more clearly illustrates the customizable hand-held terminal system according to the present invention.

Upper shell 20 is shown in exploded from small base shell 22 and large base shell 22 ', illustrating that the same upper portion 20 is useable with either the large or small configuration. Base shell 22' is depicted with RF antenna 34, scanning engine 48, magnetic stripe reader 68, additional hard drive 58, additional battery pack 54, modem 56, CD ROM or DVD drive 60, floppy disk drive 62, mass storage device 64, and PCMCIA slot module 66.

As depicted in the exemplary embodiment of FIG. 6, PCMCIA card slot module 66 or mass storage device 64 are shown as sharing an expansion slot. However, the present invention is not limited to any specific configuration and may, for example, comprise multiple identical expansion slots, each capable of accommodating a wide variety of components. Although the particular embodiment depicted in FIG. 6 is depicted with all expansion bays full for illustrative purposes, it is understood that any number of slots may be left unfilled for future expansion. Where an expansion slot is left unfilled, it is covered with a removable door (not shown) that preferably sealingly engages with housing 12.

Although the invention has been described in connection with certain particular and preferred embodiments thereof, it would be evident to those skilled in the art that various revisions and modifications of the herein described embodiments, as well as many additional applications to those described by way of example herein can be made without departing from the spirit and scope of the invention. Accordingly, scope of the invention should be determined solely by the appended claims and their legal equivalents.

What is claimed is:

1. A customizable hand-held data terminal system comprising:

(a) a microprocessor for computerized processing of data;

(b) an upper housing shell, said upper housing shell comprising a keypad area thereon, and a display opening;

(c) a keypad for input of data located on said upper housing;

(d) a display viewable through said display opening;

(e) a plurality of differently sized base housing shells, wherein each of said differently sized base housing shells is adapted to allow a different configuration of internally mounted hardware components, each of said base housing shells defining a footprint of said data terminal, and wherein each of said differently sized base housing shells are interchangeable, and wherein each of said differently sized base housing shells are capable of forming a sealing engagement with said upper housing shell to form a data terminal housing;

(f) a self-contained power supply; and (g) one or more hardware components capable of being mounted internally within the data terminal housing;

wherein said differently sized base housing shells are selectable by a user to accommodate said one or more hardware components, and wherein interchange of said differently sized base housing shells does not alter the footprint of said data terminal, and wherein each said differently sized base housing shells are adapted for use in a single type of docking station providing connection to external components.

2. The customizable hand-held data terminal system according to claim 1 further comprising a substantially transparent touch sensitive input device overlaying said display.

3. The customizable hand-held data terminal system according to claim 2 wherein said data terminal housing comprises said upper housing shell and a base housing shell of sufficient size to accommodate said one or more hardware components, wherein said one or more hardware components comprise an optical reader, an RF transceiver, or both.

4. The customizable hand-held data terminal system according to claim 3 wherein said one or more hardware components comprise an integrated optical reader and RF transceiver.

5. The customizable hand-held data terminal system according to claim 2 wherein said data terminal housing comprises said upper housing shell and a base housing shell of sufficient size to accommodate said one or more hardware components, wherein said one or more hardware components comprise one or more components selected from the group consisting of an RF transceiver, an optical reader, a magnetic stripe reader, a hard disk drive, a supplemental battery pack, a modem, a fax modem, a CD ROM drive, a recordable CD drive, a DVD drive, a floppy disk drive, a mass storage device, a data communication port, and a PCMCIA slot module.

6. A method for manufacturing a hand-held data terminal system comprising the steps of:

(a) providing data terminal having a first configuration comprising a microprocessor for computerized processing of data; an upper housing shell, said upper housing shell comprising a keypad area thereon, and a display opening; a keypad for input of data located on said upper housing; a display viewable through said display opening; and a self-contained power supply;

(b) providing a plurality of differently sized base housing shells, wherein each of said differently sized base housing shells is adapted to allow a different configuration of internally mounted hardware components, each of said base housing shells defining a footprint of said data terminal, and wherein each of said differently sized base housing shells are interchangeable, and wherein each of said differently sized base housing shells are capable of forming a sealing engagement with said upper housing shell to form a data terminal housing;

(c) selecting one or more hardware components capable of being mounted internally within the data terminal housing; and (d) selecting one of said differently sized base housing shells that is able to accommodate said one or more hardware components selected wherein interchange of said differently sized base housing shells does not alter the footprint of said data terminal, and wherein each of said differently sized base housing shells are adapted for use in a single type of docking station providing connection to external components.

7. The method for manufacturing a hand-held data terminal system according to claim 6 wherein said one or more hardware components comprise one or more components selected from the group consisting of an RF transceiver, an optical reader, a magnetic stripe reader, a hard disk drive, a supplemental battery pack, a modem, a fax modem, a CD ROM drive, a recordable CD drive, a DVD drive, a floppy disk drive, a mass storage device, a data communication port, and a PCMCIA slot module.

8. A method for configuring a hand-held data terminal system comprising the steps of:

(a) providing data terminal having a first configuration comprising a microprocessor for computerized processing of data; an upper housing shell, said upper housing shell comprising a keypad area thereon, and a display opening; a keypad for input of data located on said upper housing; a display viewable through said display opening; and a self-contained power supply;

(b) providing a plurality of differently sized base housing shells, wherein each of said differently sized base housing shells are interchangeable, and wherein each of said differently sized base housing shells are capable of forming a sealing engagement with said upper housing shell to form a data terminal housing;

(c) selecting one or more hardware components capable of being mounted internally within the data terminal housing; and (d) selecting one of said differently sized base housing shells that is able to accommodate said one or more hardware components selected wherein each of said differently sized base housing shells are adapted for use in a single type of docking station providing connection to external components.

9. The method for configuring a hand-held data terminal system according to claim 8 wherein said one or more hardware components comprise one or more components selected from the group consisting of an RF transceiver, an optical reader, a magnetic stripe reader, a hard disk drive, a supplemental battery pack, a modem, a fax modem, a CD ROM drive, a recordable CD drive, a DVD drive, a floppy disk drive, a mass storage device, a data communication port, and a PCMCIA slot module.

* * * * *